April 2, 1940.  F. A. OETTING  2,195,899
ANTI-SOIL-EROSION APPARATUS
Filed April 27, 1938  2 Sheets-Sheet 2
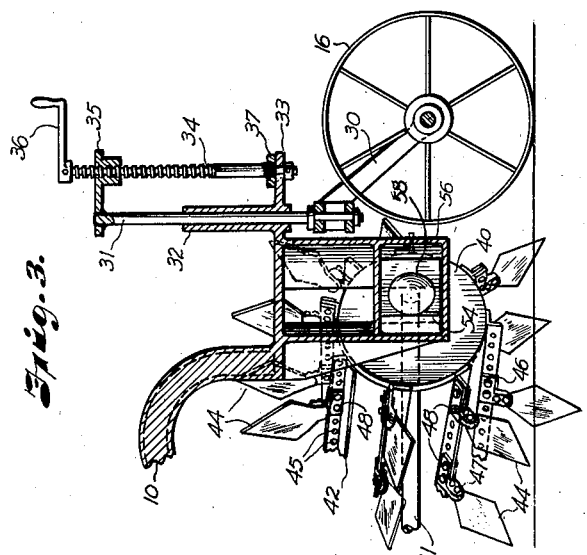
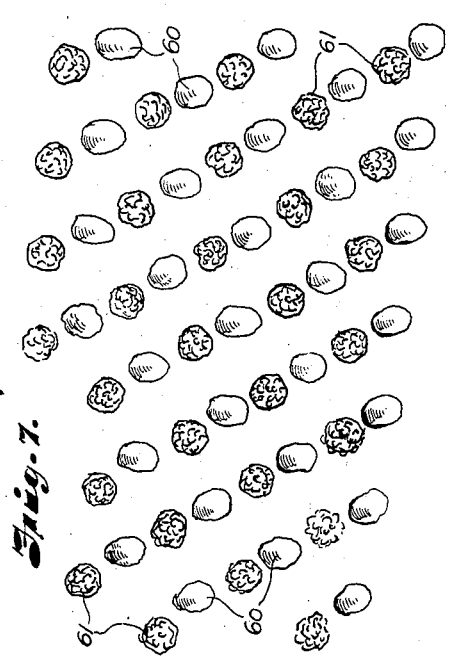
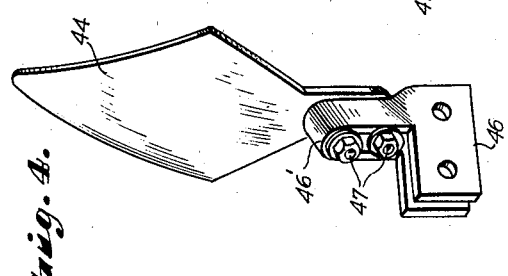
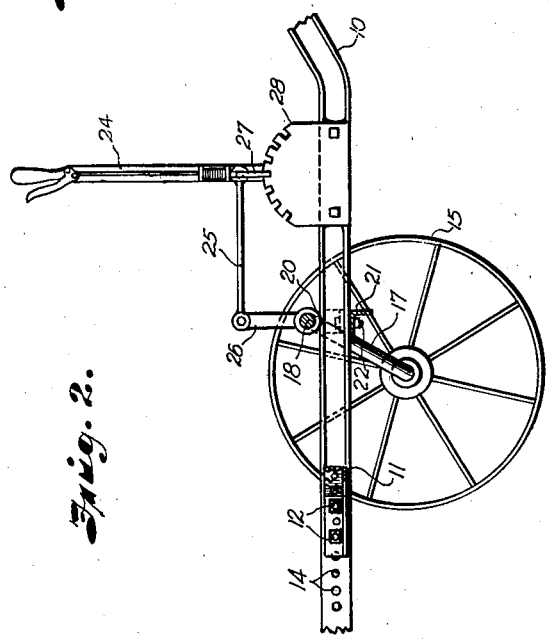
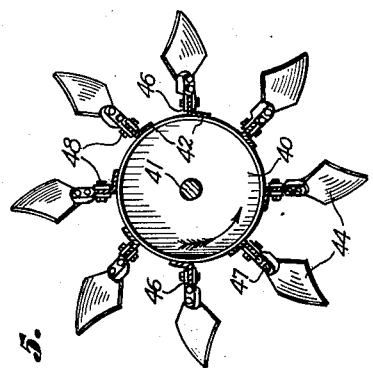
INVENTOR.
F. A. Oetting,
BY
ATTORNEYS.

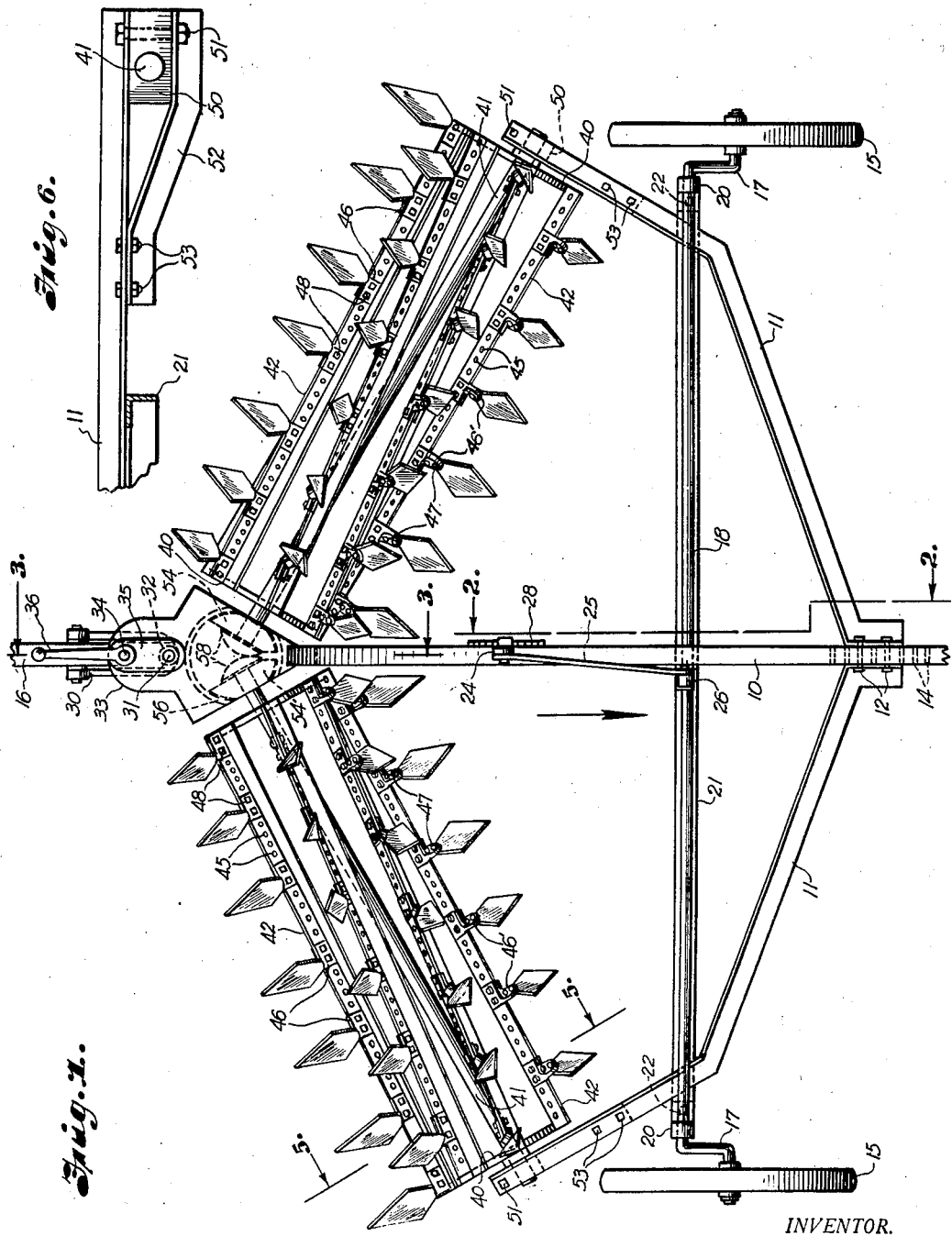

Patented Apr. 2, 1940

2,195,899

UNITED STATES PATENT OFFICE 2,195,899

ANTI-SOIL-EROSION APPARATUS

Frederick A. Oetting, Sylvan Grove, Kans., assignor of one-half to Harold E. Kirsch, Sylvan Grove, Kans.

Application April 27, 1938, Serial No. 204,580

1 Claim. (Cl. 55—11)

The present invention relates to means designed to protect arable ground from the injurious action of what are known as soil-erosion processes, which do great damage in agricultural areas and particularly those that are often subjected to periods of high winds, as well as seasons of prolonged drouth.

The primary object of the invention is to combat the disintegrating effect of those wind currents which come into direct contact with the ground surface by intercepting the disintegrating ingredients of those currents (i. e., grit, sand and other particles being borne along by the wind), and thus removing those destructive elements from the swift-moving current of the wind and hence depriving them of their opportunity for further eroding contact with the soil surface.

For accomplishing this purpose I make use of means whereby the ground surface is pitted over its whole area that is to be treated, so as to produce closely spaced pits or cavities of sufficient depth for the efficient trapping of the earth particles borne along by the wind next to or in contact with the ground surface.

Moreover, since flowing water is an important co-factor, along with wind erosion, in washing away valuable top soil, the pits or surface cavities referred to are spaced apart, in entirely unconnected relation (i. e., without any communicating trenches or channels for passage of water), thus preventing the setting up of any water flow or currents across the ground surface. At the same time these pits or holes are excavated deep enough to be of value in not only trapping soil-erosion particles and grit, but also water and conducting such water to a sufficient depth below the surface for preserving a more adequate supply of moisture for the benefit of the subsoil.

For the carrying out of these purposes of the invention I have devised an efficient apparatus of comparatively simple construction which is adapted to be operated over the area to be treated, by tractor or other means, and in which operation the diggers or shovels which comprise the excavating elements of the apparatus automatically produce the holes or pits in the proper spaced relation or pattern for achieving the desired results.

With the foregoing general objects in view the invention will now be more particularly described by reference to the accompanying drawings illustrating one proposed method of accomplishing the results as stated, as well as a suitable form of apparatus for practising the invention, after which those features which I regard as entitled to patent protection will be particularly set forth and claimed.

In the drawings—

Figure 1 is a plan view illustrating an apparatus constructed for operation in accordance with the invention (the excavating elements of only the upper half of each of the rotary excavating members being shown, for clearness of illustration);

Figures 2 and 3 are sectional elevations, representing sections taken on the lines 2—2 and 3—3, respectively, of Figure 1 (the lower excavating elements, however, being included in Figure 3);

Figure 4 is an enlarged detail perspective illustrating one of the excavating or digging elements;

Figure 5 is a transverse sectional view of one of the rotary excavating members and representing a section taken on the line 5—5 of Figure 1;

Figure 6 is a detail elevation (on a slightly larger scale) showing a portion of the frame and its bearing block for the axle of one of said rotary excavating members; and Figure 7 is a diagrammatic plan view illustrating the spaced relations of the pits or excavations produced by the operation of the apparatus.

Referring to the drawings in detail, the particular form of the apparatus there shown for purposes of illustration comprises a suitable framework made up of a central beam 10 and side frame pieces 11 which may be adjustably connected, as by bolts 12 and series of bolt openings 14, to the sides of the beam 10. The framework is carried on a pair of forward supporting wheels 15 and a rear caster wheel 16. The forward wheels 15 are journaled on the crank-shaped ends 17 of an axle rod 18 mounted in bearings 20 at the outer ends of a transverse frame piece 21 projecting across the beam 10 and the frame pieces 11 and secured thereto by bolts 22—as illustrated in Figures 1 and 2. The axle rod 18 may be rocked for varying the operating level of the forward portion of the framework by means of a hand lever 24 fulcrumed on the beam 10 and connected by a link 25 with an arm 26 which is fixed to said rod 18; and said lever 24 is also provided with a detent 27 for engagement with a fixed ratchet plate 28 mounted on said beam 10 (see Figure 2).

The rear wheel 16 is journaled in a yoke 30 having a swivel mounting on the lower end of a rod 31 which is mounted for vertical adjusting movement in a tubular bearing 32 projecting up from a plate or frame member 33 attached to the rear end of the beam 10.

The adjustment of said rod 31 is effected by means of an adjusting screw 34 (see Figure 3), the lower end of which is rotatably connected with the plate 33, whereas its upper end portion is in threaded engagement with a horizontal arm 35 carried by the upper end of said rod 31. The screw 34 has a suitable operating handle 36, and its lower end is also provided with a clamp nut 37 for engaging the upper face of the plate 33, to clamp and hold the parts after their proper adjustment.

The excavating means proper comprises a pair of rotary frame members made up in approximately cylindrical shape and each provided with a plurality of the excavating or digging elements arranged in staggered relation thereon. Each of these frame members comprises a pair of circular end plates or disks 40 mounted on an axle rod 41, and said end plates or disks being connected by a series of angle bars 42 all arranged in the same oblique relation with reference to the axle, or in such fashion that the outer end of each bar 42 registers just about opposite to the inner end of the next following bar (considering the direction of rolling travel of the unit, as indicated by the arrow in Figure 1). These bars 42 are for the attachment of the excavating elements, comprising a series of digger or shovel elements 44 having a particular pitch hereinafter referred to. Each of the bars 42 is provided with a row of bolt openings 45 for the attachment of clips 46, each of said clips having a yoke portion 46' for embracing a pair of pins or bolts 47 carried by the shank portion of the corresponding shovel element—as clearly shown in Figure 4. These clips 46 are attached to the bars 42 by means of bolts 48, and the series of openings 45 referred to permit proper spacing of the digger or shovel elements along their supporting bars.

The outer ends of the axles 41 are carried in bearing blocks 50 which are pivotally anchored by means of bolts 51 at the outer ends of the frame pieces 11, said blocks being held against the under sides of said frame pieces by means of short angle frame sections 52 which are held in place by means of said pivot bolts 51 and suitable additional bolts 53—as illustrated in Figure 6.

The inner ends of the axles 41 are journaled in curved bearing segments 54 having bearing engagement against the interior of a cylinder shaped housing 56 supported from the under face of the plate member 33. Moreover, as shown in Figures 1 and 3, the inner ends of the axles are provided with enlarged bearing portions 58 of approximately spherical shape for continuous abutting engagement with each other in all operative positions of the excavating means, including their different positions of adjustment as hereinafter referred to.

It will also be noted that the bearings 50 for the outer ends of the axles 41 are located in advance of the bearings 54, with the result that both of the rotary units of the excavating means operate about axes maintained at oblique angles to the path of travel of the apparatus.

In the operation of the apparatus, the rotary excavating units are lowered by means of the handle 36 and screw 34 to set the excavating mechanism at the proper elevation for operating the digging or excavating elements 40 at a suitable depth. Likewise, the lever 24 is operated to correspondingly lower the forward portion of the apparatus. Moreover, the angle of the axes of the rotary units of the excavating means is previouly set by appropriate adjustment for that purpose, as provided for by the series of bolt openings 14 for the bolts 12 which secure the forward ends of the frame members 11, as shown in Figs. 1 and 2.

The apparatus is then drawn, by any desired tractor means attached to the beam 10, over the ground area which is to be treated, and in the travel of the apparatus the rotary excavating units are thereby caused to rotate (in the direction indicated by the arrow in Figure 5) by engagement of the excavating elements 44 with the ground, in which operation said elements are forced into the ground for producing the excavating action, as represented by the holes or pits 60 and the excavated mounds of soil 61, as diagrammatically illustrated in Figure 6. In this connection the important considerations to be regarded in the spacing of the digger or shovel elements 44 (as provided for by the series of bolt openings 45), as well as the particular pitch of said elements and the oblique angular arrangement of the rotary units, are for the purpose of not only producing an effective digging or excavating action out also of depositing the excavated soil in mounds 61 as far away from the pits or holes 60 as possible, thus leaving the latter completely open and exposed for performing the trapping function, as designed for carrying out the main object of the invention.

For fully appreciating this object, it is to be borne in mind that it is not the upper strata of the wind currents, or any matter borne thereby, which produces any of the damages caused by soil erosion. Hence, the ordinarily visible phenomena, to be observed in so-called dust storms, constitute no real index or measure of the damage actually being done, since the dust content of the upper strata, out of contact with the ground surface, is negligible in comparison with the erosive effects produced by that stratum of the wind current which makes actual contact with the ground surface. This stratum either carries or picks up soil particles which, moving violently with the wind current, constitute effective abrading means for disintegrating the surface of the soil; obviously such abrading and disintegrating action can take place at the ground surface and nowhere else. If possible, therefore to stop the travel of this soil disintegrating means (these earth particles borne along by the force of the wind currents), the main damage resulting from such disintegrating action can obviously be eliminated. Accordingly this is the primary purpose of the excavating apparatus of the present invention, viz, to produce pits or openings which provide traps directly in the path of that bottom portion of the wind current which is laden with the erosive ingredients, so as to capture those ingredients and thereby stop their further progress, and hence prevent all the damage that might result from the erosive action which would otherwise follow. The provision of the closely spaced pits or openings therefore provides means for efficiently trapping the dust and gritty particles which are swept by the wind across the ground surface provided with such openings; and as fast as such erosive ingredients are again collected by the wind current they are retrieved by the trap openings within the ground surface area which has been worked by the apparatus.

Naturally the pits or openings 60 may become gradually filled up with the trapped dust and earth particles, including of course loose soil blown in from the mounds 61 of the excavated material; this may simply require a further operation of the apparatus to re-work the same area as before, such repetition of the operation however (like that of a cultivator), representing a comparatively small labor effort in comparison with the advantages to be secured in the way of conservation of valuable soil material which is otherwise completely lost.

The fact that the pits or holes which are produced by operation of the excavating means are entirely separate and unconnected is an important feature. Apparatus has heretofore been used, called summer fallowing apparatus, designed to accomplish results similar to those aimed at by the present invention; this summer fallowing operation produces trenches or furrows with the material dumped at intervals along the furrows. The dumped material forms dams, which are, however, washed away by the first rains sufficient to produce currents along the furrows, so that the erosive effects of the water currents proceed unabated. By the operation of the present invention, no furrows or trenches of any sort are produced, but simply separate pits or holes without any connecting channels or passages of any sort; hence there is no opportunity for any channels or flow passages to be formed in times of rainfall or for promoting the erosive effects of water following any water courses already established. Moreover, as already indicated, the depth of the holes or pits 60, as produced by the apparatus herein described, is such as to promote the retention of the water which may be trapped from rainfall, by conducting it to the subsoil and not allowing it to be lost by the usual surface drainage.

It will therefore be apparent that I have provided efficient means for the carrying out of the proposed objects of my invention; and while I have illustrated and described what I regard as the preferred mode of practising the invention I desire to be understood as specifically reserving the right to make such changes or modifications as may be deemed to fairly fall within the spirit and scope of the appended claim.

What I claim and desire to secure by Letters Patent is:

Apparatus for treating arable ground surfaces for preventing soil erosion, comprising a transportable frame carrying a pair of rotary excavating members mounted for movement about separate axes at oblique angles to the direction of travel of the apparatus, said frame being provided with pivotal bearings for the outer ends of said rotary members and the inner ends of said rotary members being provided with curved thrust bearing surfaces in continuous abutting relation, each of said rotary members being provided with a plurality of spaced excavating elements operated by the traveling movement of the apparatus to produce separated pits or holes in the ground surface and to deposit the excavated soil upon the ground surface between said holes.

FREDERICK A. OETTING.